(12) United States Patent
Fukuda et al.

(10) Patent No.: US 8,179,148 B2
(45) Date of Patent: May 15, 2012

(54) INFORMATION DETECTING APPARATUS AND METHOD

(75) Inventors: Hirotoshi Fukuda, Yokohama (JP); Junichi Iida, Tokyo (JP); Masato Sano, Tokyo (JP); Toshinori Arai, Komae (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 210 days.

(21) Appl. No.: 12/769,337

(22) Filed: Apr. 28, 2010

(65) Prior Publication Data
US 2010/0332695 A1 Dec. 30, 2010

(30) Foreign Application Priority Data

Jun. 26, 2009 (JP) ................... 2009-151835

(51) Int. Cl.
*G01R 23/20* (2006.01)
*H04B 15/00* (2006.01)
(52) U.S. Cl. ...................... 324/620; 702/193
(58) Field of Classification Search .......... 324/620, 324/612, 600; 702/74, 124, 183, 189, 191, 702/193
See application file for complete search history.

(56) References Cited

U.S. PATENT DOCUMENTS

| 4,286,282 | A | * | 8/1981 | Christopher et al. | 386/202 |
| 5,245,610 | A | * | 9/1993 | Lindell | 370/329 |
| 5,289,391 | A | * | 2/1994 | Ibrahim et al. | 702/74 |
| 7,792,180 | B2 | * | 9/2010 | Ichikawa | 375/219 |

FOREIGN PATENT DOCUMENTS

JP 2006-203338 8/2006

* cited by examiner

*Primary Examiner* — Hoai-An D Nguyen
(74) *Attorney, Agent, or Firm* — McDermott Will & Emery LLP (57) ABSTRACT

Proposed is a highly reliable information detecting apparatus and method. In an information detecting apparatus and method for detecting transmission information a transmission signal in which a burst period of transmitting a burst signal and a space period as a no-signal period are repeated in a pattern according to the subject matter of the transmission information, whether the absolute value of a signal amplitude level of the transmission signal is not less than a first threshold is detected, whether the absolute value of a signal amplitude level of the transmission signal is not less than a second threshold is detected, and whether the amplitude level displacement of the transmission signal is based on noise or the reception of the transmission information is determined based on the detection results.

4 Claims, 7 Drawing Sheets

INFORMATION DETECTING APPARATUS AND METHOD

CROSS REFERENCES

This application relates to and claims priority from Japanese Patent Application No. 2009-151835, filed on Jun. 26, 2009, the entire disclosure of which is incorporated herein by reference.

The present invention generally relates to an information detecting apparatus and method and, for example, can be suitably applied to a receiving apparatus that is compliant with the Serial ATA (Advanced Technology Attachment) standard.

BACKGROUND

Conventionally, as a method of connecting a host computer (hereinafter referred to as the "host") and a storage device such as an optical disk device or a hard disk device (hereinafter referred to as the "device"), Serial ATA as a high-speed serial transfer protocol standard has been formulated.

With the Serial ATA standard, negotiation referred to as the OOB (Out of Band) sequence is conducted prior to the data transfer. The OOB sequence is performed according to the following routine shown in FIG. 7.

Figure 7:
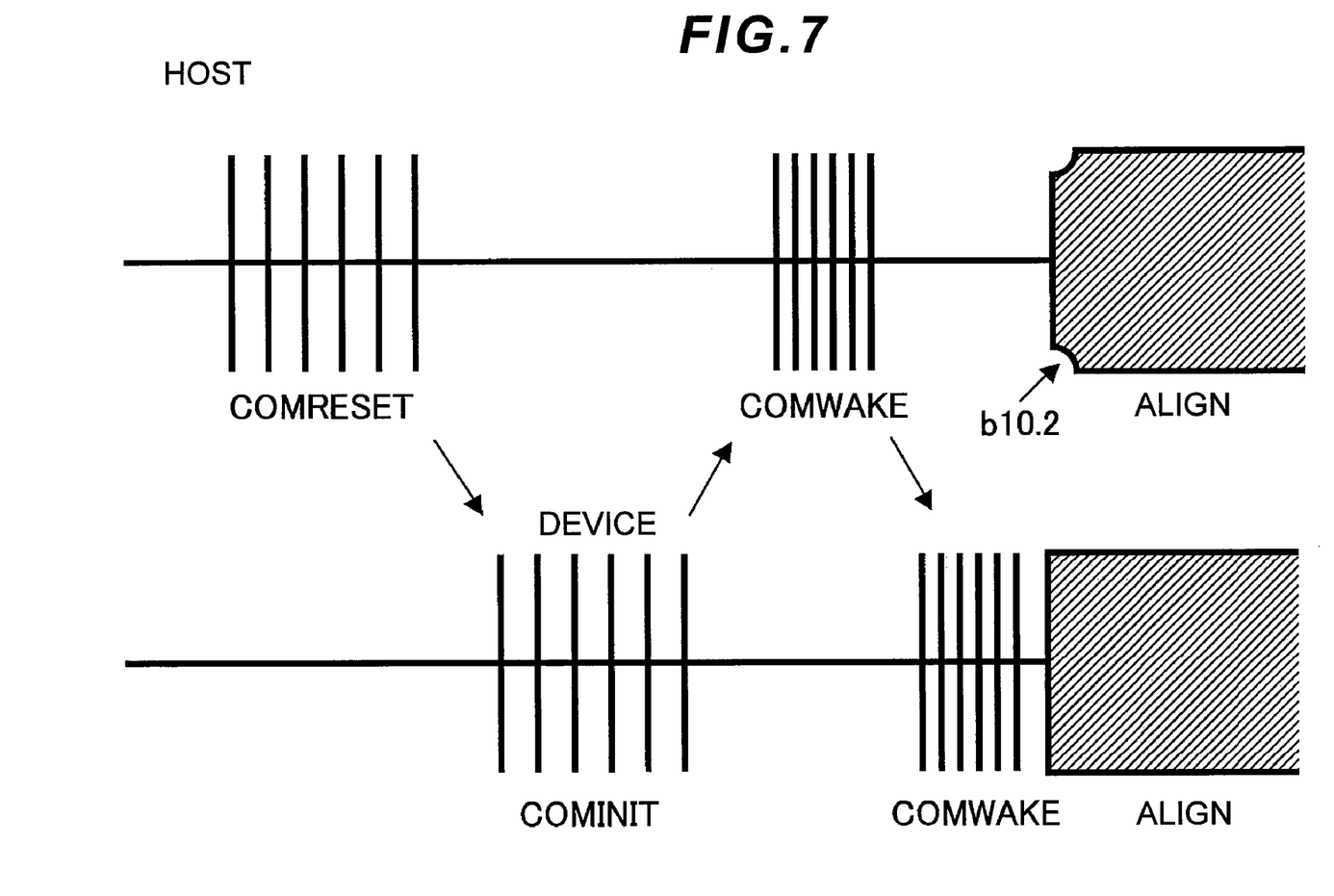
FIG. 7 is a waveform diagram for explaining the OOB sequence.

Specifically, after the host is turned on, it sends a COMRESET signal to the device. When the device receives the COMRESET signal, it sends a COMINIT signal to the host. Subsequently, when the host receives the COMINIT signal, it sends a COMWAKE signal to the device, and, when the device receives the COMWAKE signal, it sends a COMWAKE signal to the host.

As described above, the foregoing negotiation is conducted by repeating the operation of the host or the device detecting the respective signals sent by the other. Data transfer is started when the negotiation is performed normally. The COMRESET signal, the COMWAKE signal and the COMINIT signal are collectively referred to as the OOB signal.

The OOB signal is a signal that repeats a period (burst period) of a constant length in which a burst signal defined in the Serial ATA standard is transmitted, and a no-signal period (space period), and the length of the burst period and the space period as well as the frequency thereof are defined in the standard. Specifically, the burst period and the space period of the COMRESET signal and the COMINIT signal are approximately 106.7 [ns] and approximately 320 [ns], respectively, and the number of burst periods is 6 times. Meanwhile, the burst period and the space period of the COMWAKE signal are approximately 106.7 [ns], respectively, and the number of burst periods is 6 times. Generally speaking, a receiving apparatus that is compliant with the Serial ATA standard determines that an OOB signal has been detected upon detecting the burst period and the space period 3 times or more in succession.

Nevertheless, the receiving apparatus sometimes falsely detects noise as an OOB signal. Thus, Japanese Published Unexamined Application No. 2006-203338 (Patent Document 1) discloses a method of preventing such false detection by using a squelch detection circuit that changes the threshold according to the output.

SUMMARY

Nevertheless, even with the method disclosed in Patent Document 1, noise is often falsely detected as an OOB signal, and there is a problem in terms of the reliability being insufficient.

The present invention was devised in view of the foregoing points. Thus, an object of this invention is to propose a highly reliable information detecting apparatus and method.

In order to achieve the foregoing object, the present invention provides an information detecting apparatus for detecting transmission information from a transmission signal in which a burst period of transmitting a burst signal and a space period as a no-signal period are repeated in a pattern according to the subject matter of the transmission information. This information detecting apparatus comprises a first comparison circuit for detecting whether the absolute value of a signal amplitude level of the transmission signal is not less than a first threshold, a second comparison circuit for detecting whether the absolute value of a signal amplitude level of the transmission signal is not less than a second threshold that is different from the first threshold, and a determination unit for determining whether the amplitude level displacement of the transmission signal is based on noise or the reception of the transmission information based on the detection results of the first and second comparison circuits, whereby the first and second thresholds are set to different values.

The present invention additionally provides an information detecting method for detecting transmission information from a transmission signal in which a burst period of transmitting a burst signal and a space period as a no-signal period are repeated in a pattern according to the subject matter of the transmission information. This information detecting method comprises a first step of detecting whether the absolute value of a signal amplitude level of the transmission signal is not less than a first threshold and detecting whether the absolute value of a signal amplitude level of the transmission signal is not less than a second threshold that is different from the first threshold, and a second step of determining whether the amplitude level displacement of the transmission signal is based on noise or the reception of the transmission information based on the detection results.

According to the present invention, it is possible to realize a highly reliable information detecting apparatus and method capable of detecting transmission information with high accuracy.

DETAILED DESCRIPTION

An embodiment of the present invention is now explained in detail with reference to the attached drawings.

(1) First Embodiment

Figure 1:
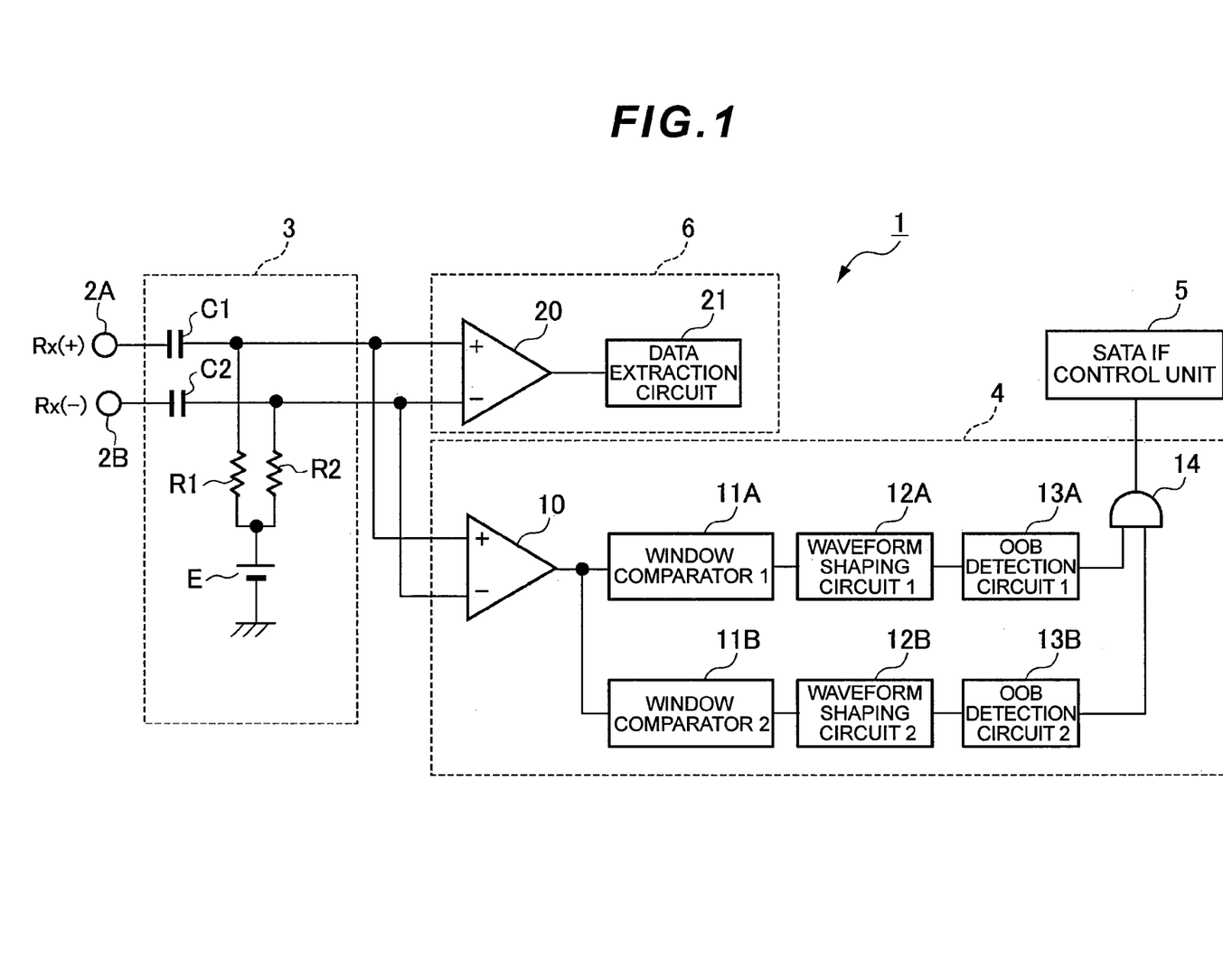
FIG. 1 is a block diagram showing the overall configuration of the receiving apparatus according to the first embodiment.

FIG. 1 shows the overall receiving apparatus 1 according to the first embodiment. The receiving apparatus 1 is equipped with a physical layer controller of a host or a device that is compliant with the Serial ATA standard, and comprises a high pass filter unit 3, an OOB signal detection unit 4, a Serial ATA interface control unit 5 and a data extraction unit 6.

The high pass filter unit 3 includes a first high pass filter configured from a first AC coupling capacitor C1 and a first termination resistor R1 connected in series to a first input terminal 2A, and a second high pass filter configured from a second AC coupling capacitor C2 and a second termination resistor R2 connected in series to a second input terminal 2B. The first input terminal 2A is provided with a normal phase side of a transmission signal that is sent via differential transmission from the communication partner, and the second input terminal 2B is provided with a reverse phase side of such transmission signal. The first and second termination resistors R1, R2 are commonly connected to a positive electrode side of a bias supply E to which a negative electrode side is grounded.

Consequently, the high pass filter unit 3 extracts a high frequency component of the normal phase side of the transmission signal, superposes a bias voltage according to the output voltage of the bias supply E to the extracted high frequency component, and outputs this as a normal phase side high frequency component signal from the connection midpoint of the first AC coupling capacitor C1 and the first termination resistor R1. The high pass filter unit 3 extracts a high frequency component of the reverse phase side of the transmission signal, superposes the foregoing bias voltage to the extracted high frequency component, and outputs this as a reverse phase side high frequency component signal via the connection midpoint of the second AC coupling capacitor C2 and the second termination resistor R2.

The OOB signal detection unit 4 is configured from a squelch detection difference amplifier 10, first and second window comparators 11A, 11B, first and second waveform shaping circuits 12A, 12B, first and second OOB detection blocks 13A, 13B, and an AND gate circuit 14.

With the squelch detection difference amplifier 10, a non-inverted input terminal is connected to the connection midpoint of the first AC coupling capacitor C1 and the first termination resistor R1 of the high pass filter unit 3, and an inverted input terminal is connected to the connection midpoint of the second AC coupling capacitor C2 and the second termination resistor R2 of the high pass filter unit 3. The squelch detection difference amplifier 10 creates a differential signal as shown in FIG. 2A according to a differential voltage between the normal phase side high frequency component signal provided from the high pass filter unit 3 to the noninverted input terminal and the reverse phase side high frequency component signal provided from the high pass filter unit 3 to the inverted input terminal, and sends the created differential signal to the first and second window comparators 11A, 11B.

The first window comparator 11A compares the signal level of the differential signal provided from the squelch detection difference amplifier 10 with the first and second reference voltages (where first reference voltage>second reference voltage), creates a first window comparator signal that rises to a high level during a period when the signal level of the differential signal is greater than the first reference voltage or a period when it is smaller than the second reference voltage, and rises to a low level when the signal level of the differential signal is between the first and second reference voltages, and sends this to the first waveform shaping circuit 12A. In the case of this embodiment, in order to cause the first window comparator 11A to function as a squelch detection circuit for detecting whether the absolute value of the signal level of the differential signal is not less than a predetermined first threshold, the first reference voltage is set to "D1" and the second reference voltage is set to "−D1," respectively.

The first waveform shaping circuit 12A performs waveform shaping processing to the first window comparator signal provided from the first window comparator 11A for compiling the respective burst portions into a single pulse, and sends the consequently obtained first waveform shaping signal as shown in FIG. 2B to the first OOB detection circuit 13A.

The first OOB detection circuit 13A monitors the first waveform shaping signal provided from the first waveform shaping circuit 12A, and measures the pulse width (corresponds to the burst period of the OOB signal) of the respective pulses contained in the first waveform shaping signal, number of successive pulses (corresponds to the number of burst periods of the OOB signal) and the pulse interval (corresponds to the space period of the OOB signal), respectively. When the first OOB detection circuit 13A detects three or more pulses in succession in which both the pulse width and the pulse interval obtained from the foregoing measurement coincide with the time specified as the burst period and the space period of the COMRESET signal, the COMWAKE signal or the COMINIT signal defined in the Serial ATA standard, it sends a corresponding first OOB detection signal to the AND gate circuit 14.

Specifically, when the first OOB detection unit 13A detects three or more pulses in succession in which the pulse width is approximately 106.7 [ns] and the interval is approximately 320 [ns], it determines that a COMRESET signal or a COMINIT signal has been received, and sends a corresponding first OOB detection signal (for example, pulse signal of a predetermined first pulse pattern) to the AND gate circuit 14. When the first OOB detection unit 13A detects three or more pulses in succession in which the pulse width is approximately 106.7 [ns] and the interval is approximately 160.7 [ns], it determines that a COMWAKE signal has been received, and sends a corresponding first OOB detection signal (for example, pulse signal of a predetermined second pulse pattern) to the AND gate circuit 14.

Moreover, the second window comparator 11B compares the signal level of the differential signal provided from the squelch detection difference amplifier 10 with pre-set third and fourth reference voltages (where third reference voltage>fourth reference voltage), creates a second window comparator signal that rises to a high level during a period when the signal level of the differential signal is greater than the third reference voltage or a period when it is smaller than the fourth reference voltage, and rises to a low level when the signal level of the differential signal is between the third and fourth reference voltages, and sends this to the second waveform shaping circuit 12B.

In the case of this embodiment, in order to cause the second window comparator 11B to also function as a squelch detection circuit for detecting whether the absolute value of the signal level of the differential signal is not less than a predetermined second threshold, the third reference voltage is set to "D2" and the fourth reference voltage is set to "−D2," respectively. Moreover, in the case of this embodiment, as shown in FIG. 2A, the third reference voltage ("D2") is set to "D2" that is smaller than the first reference voltage.

The second waveform shaping circuit 12B performs waveform shaping processing, as with the first waveform shaping circuit 12A, to the second window comparator signal provided from the second window comparator 11B for compiling the respective burst portions into a single pulse, and sends the consequently obtained second waveform shaping signal to the second OOB detection circuit 13B.

The second OOB detection circuit 13B monitors the second waveform shaping signal provided from the second waveform shaping circuit 12B, and, as with the first OOB detection circuit 13A, measures the pulse width and interval of the respective pulses contained in the second waveform shaping signal as well as the number of pulses in succession. When the second OOB detection circuit 13B detects three or more pulses in succession in which both the pulse width and the pulse interval obtained from the foregoing measurement coincide with the time specified as the burst period and the space period of the COMRESET signal, the COMWAKE signal or the COMINIT signal defined in the Serial ATA standard, it sends a corresponding second OOB detection signal to the AND gate circuit 14.

The AND gate circuit 14 creates an OR signal in which the first and second OOB detection signals both rise to a high level only during the high level period based on the first OOB detection signal provided from the first OOB detection circuit 13A and the second OOB detection signal provided from the second OOB detection circuit 13B, and sends this to the Serial ATA interface control unit 5.

The Serial ATA interface control unit 5 determines whether the COMRESET signal, the COMRESET signal or the COMINIT signal has been input based on the OR signal provided from the AND gate circuit 14, and executes prescribed processing concerning the OOB sequence described above with reference to FIG. 7 as needed based on the determination result.

Meanwhile, the data extraction unit 6 is configured from a data extraction difference amplifier 20 and a data extraction block 21.

With the data extraction difference amplifier 20, a noninverted input terminal is connected to the connection midpoint of the first AC coupling capacitor C1 and the first termination resistor R1 of the high pass filter unit 3, and an inverted input terminal is connected to the connection midpoint of the second AC coupling capacitor C2 and the second termination resistor R2 of the high pass filter unit 3. Consequently, the data extraction difference amplifier 20 sends a differential signal according to a differential voltage between the normal phase side high frequency component signal provided from the high pass filter unit 3 to the noninverted input terminal and the reverse phase side high frequency component signal provided from the high pass filter unit 3 to the inverted input terminal to the data extraction block 21.

Based on the control of the Serial ATA interface control unit 5, the data extraction block 21 extracts data contained in the differential signal provided from the data extraction difference amplifier 20 after the OOB sequence with the device or host of the communication partner-side is complete.

In the foregoing configuration, if a normal OOB signal is input into the first and second input terminals 2A, 2B of the receiving apparatus 1, a differential signal of a waveform as shown in FIG. 2A is output from the squelch detection difference amplifier 10, a first waveform shaping signal of a waveform as shown in FIG. 2B is output from the first waveform shaping circuit 12A based on the foregoing differential signal, and a second waveform shaping signal as shown in FIG. 2C of a waveform that is approximately the same as the first waveform shaping signal is also output from the second waveform shaping circuit 12B.

Figure 2:
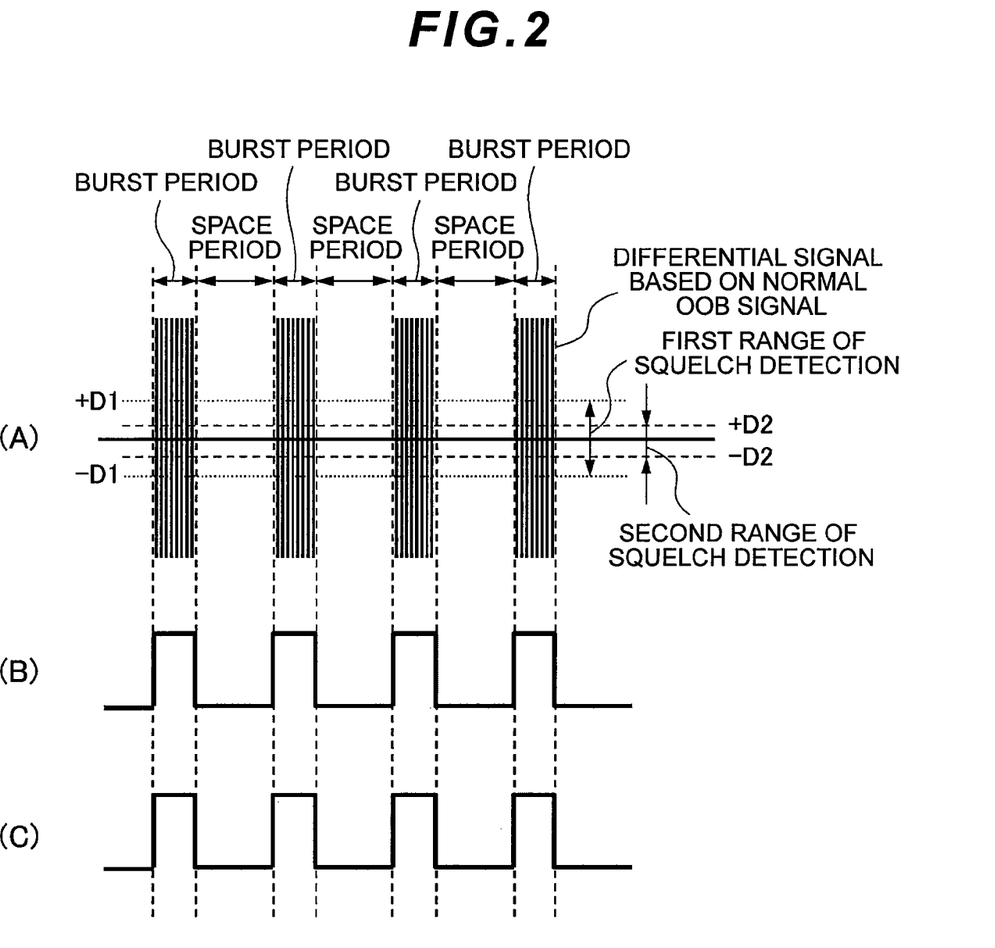
FIG. 2 is a waveform diagram showing the waveform of the differential signal and the first and second window comparator signals in a case where the receiving apparatus of FIG. 1 receives a normal OOB signal.

Accordingly, in the foregoing case, the first and second OOB detection circuits 13A, 13B will both detect the same OOB signal (COMRESET signal, COMINIT signal or COMWAKE signal), and send the first or second OOB detection signal of the same pulse pattern according to that OOB signal to the AND gate circuit 14. Thus, an OR signal having the same pulse pattern as the foregoing pulse pattern will be output from the AND gate circuit 5 to the Serial ATA interface control unit 5.

Thus, in the foregoing case, the Serial ATA interface control unit 5 will execute operations according to that OOB signal based on the OR signal.

Meanwhile, if noise as shown in FIG. 3A is input to the first and second input terminals of the receiving apparatus 1, a first waveform shaping signal of a waveform as shown in FIG. 3B is output from the first waveform shaping circuit 12A, and a second waveform shaping signal as shown in FIG. 3C of a waveform that is different from the first waveform shaping signal is output from the second waveform shaping circuit 12B.

Figure 3:
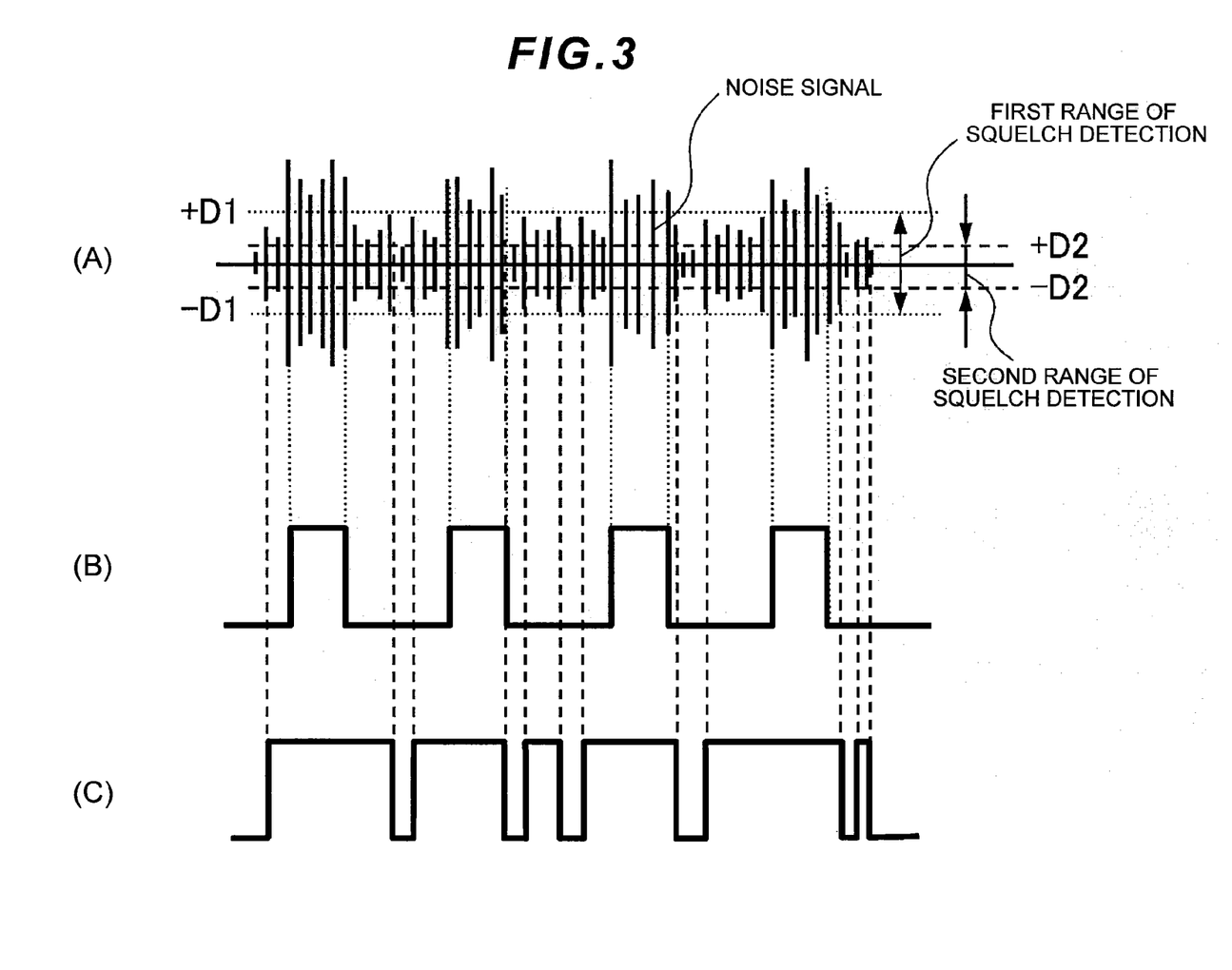
FIG. 3 is a waveform diagram showing the waveform of the differential signal and the first and second window comparator signals in a case where the receiving apparatus of FIG. 1 receives noise.

Accordingly, in the foregoing case, since the waveforms of the first and second waveform shaping signals are different, it is possible to prevent the false detection that both the first and second OOB detection circuits 13A, 13B have received the same OOB signal. Moreover, even in cases of a false detection that either the first or the second OOB detection circuit 13A, 13B has received an OOB signal, an OOB detection signal of the pulse pattern that is associated with the COMRESET signal, the COMINIT signal or the COMWAKE signal will not be output from the second or the first OOB detection circuit 13B, 13A with no false detection.

Thus, in the foregoing case, an OR signal of the same pulse pattern as that OOB signal will not be output from the AND gate circuit 14, and the Serial ATA interface control unit 5 will not malfunction based on the OR signal.

According to the receiving apparatus 1 of the present embodiment described above, squelch detection is performed in the first and second window comparators 11A, 11B respectively with different thresholds in relation to the differential signal that is output from the squelch detection difference amplifier 10, and whether the level displacement of the transmission signal is based on noise or the reception of an OOB signal is determined according to the foregoing detection result. Thus, it is possible to prevent the false detection of noise as an OOB signal with high accuracy and realize a highly reliable receiving apparatus.

(2) Second Embodiment

Figure 4:
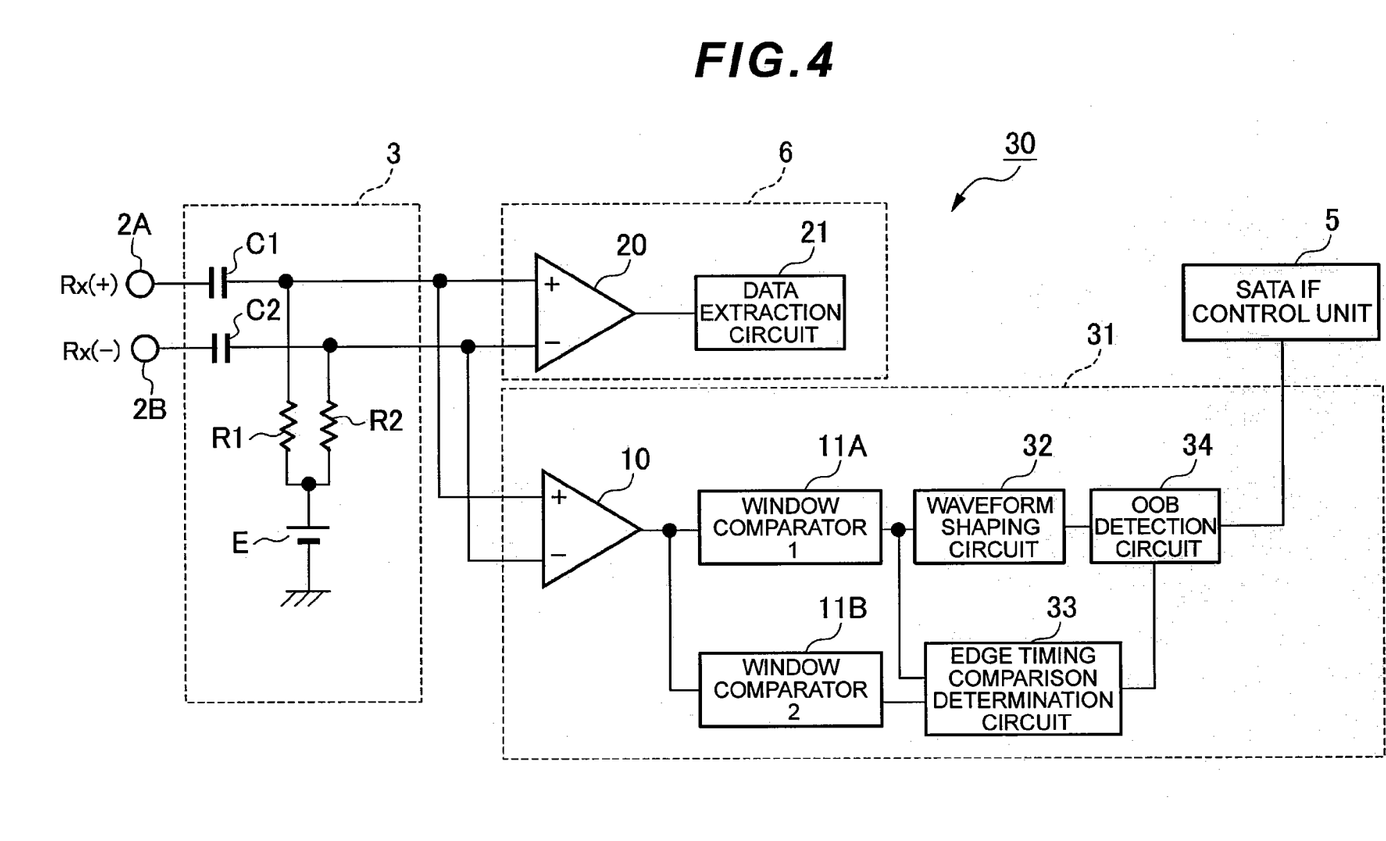
FIG. 4 is a block diagram showing the overall configuration of the receiving apparatus according to the second embodiment.

FIG. 4 in which the same reference numerals are given to the corresponding components of FIG. 1 shows a receiving apparatus 30 according to the second embodiment. The receiving apparatus 30 is configured the same as the receiving apparatus 1 (FIG. 1) according to the first embodiment excluding the configuration of the OOB signal detection unit 31.

Specifically, in the case of this embodiment, the OOB signal detection unit 31 is configured from a squelch detection difference amplifier 10, first and second window comparators 11A, 11B, a waveform shaping circuit 32A, an edge timing comparison determination circuit 33, and an OOB detection block 34.

In the OOB signal detection unit 31, a first window comparator signal output from the first window comparator 11A is provided to the waveform shaping circuit 11A and the edge timing comparison determination circuit 33, and a second window comparator signal output from the second window comparator 11B is output to the edge timing comparison determination circuit 33.

The waveform shaping circuit 32 has the same functions as the first and second waveform shaping circuits 12A, 12B (FIG. 1) of the first embodiment, and performs waveform shaping processing to the first window comparator signal provided from the first window comparator 11A for compiling the respective burst portions into a single pulse, and sends the consequently obtained first waveform shaping signal to the OOB detection circuit 34.

The edge timing comparison determination circuit 33 compares, with respect to the first window comparator signal provided from the first window comparator 11A and the second window comparator signal provided from the second window comparator 11B, the timing that the first and second window comparator signals change from a low level to a high level; that is, the timing of the rising edge.

The edge timing comparison determination circuit 33 sends, to the OOB detection block 34, a low level comparison determination signal if the time difference from the time that the second window comparator signal rises to a high level to the time that the first window comparator signal rises to a high level is greater than a predetermined threshold (hereinafter referred to as the "edge timing comparison threshold"), and a high level comparison determination signal if the time difference from the time that the second window comparator signal rises to the time that the first window comparator signal rises is not greater than the edge timing comparison threshold.

The OOB detection circuit 34 monitors the waveform shaping signal provided from the waveform shaping circuit 32, and, as with the first and second OOB detection circuits 13A, 13B (FIG. 1) of the first embodiment, measures the pulse width of the respective pulses contained in the waveform shaping signal as well as the number of pulses in succession and the pulse interval. When the OOB detection circuit 34 detects three or more pulses in succession in which both the pulse width and the pulse interval obtained from the foregoing measurement coincide with the time specified as the burst period and the space period of the COMRESET signal, the COMWAKE signal or the COMINIT signal defined in the Serial ATA standard, and the comparison determination signal provided from the edge timing comparison determination circuit 33 is of a high level, it sends an OOB detection signal corresponding to the detected OOB signal to the Serial ATA interface control unit 5.

The Serial ATA interface control unit 5 determines whether the COMRESET signal, the COMRESET signal or the COMINIT signal has been input based on the OOB signal provided from the OOB detection circuit 34, and executes prescribed processing concerning the OOB sequence described above with reference to FIG. 7 as needed based on the determination result.

Figure 5:
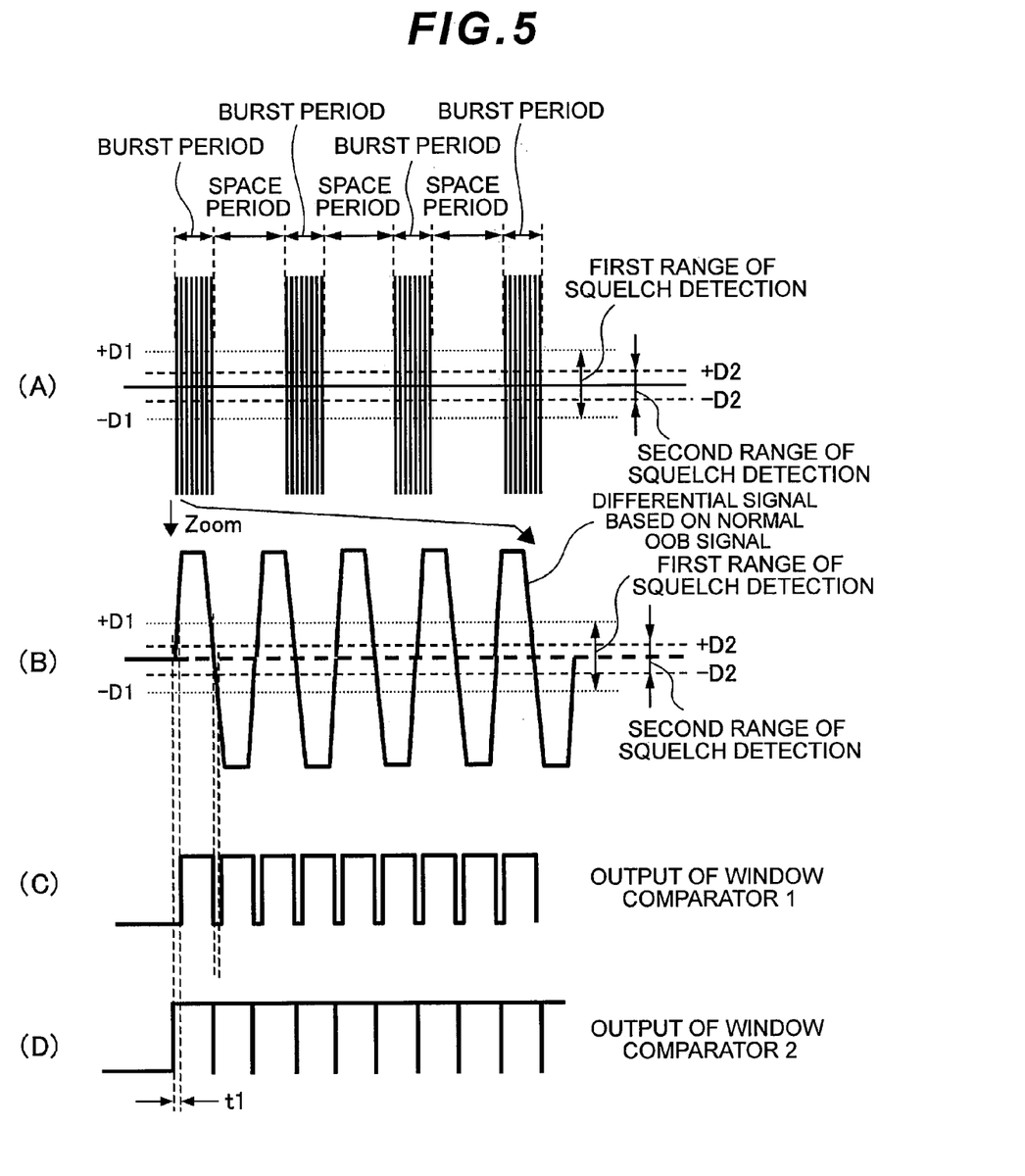
FIG. 5 is a waveform diagram showing the waveform of the differential signal and the first and second window comparator signals in a case where the receiving apparatus of FIG. 4 receives a normal OOB signal.

In the foregoing configuration, if a normal OOB signal is input into the first and second input terminals 2A, 2B of the receiving apparatus 30, a differential signal of a waveform as shown in FIG. 5A is output from the squelch detection difference amplifier 10. In the foregoing case, since the rise of burst portions in the OOB signal is quick, the rise of the pulse waveform of the corresponding portions of the corresponding differential signal will also be quick as shown in FIG. 5B, and, as shown in FIG. 5C and FIG. 5D, the time difference t1 between the rise timing of the first window comparator signal (FIG. 5C) output from the first window comparator 11A and the rise timing of the second window comparator signal (FIG. 5D) output from the second window comparator 11B will be minimal.

Figure 6:
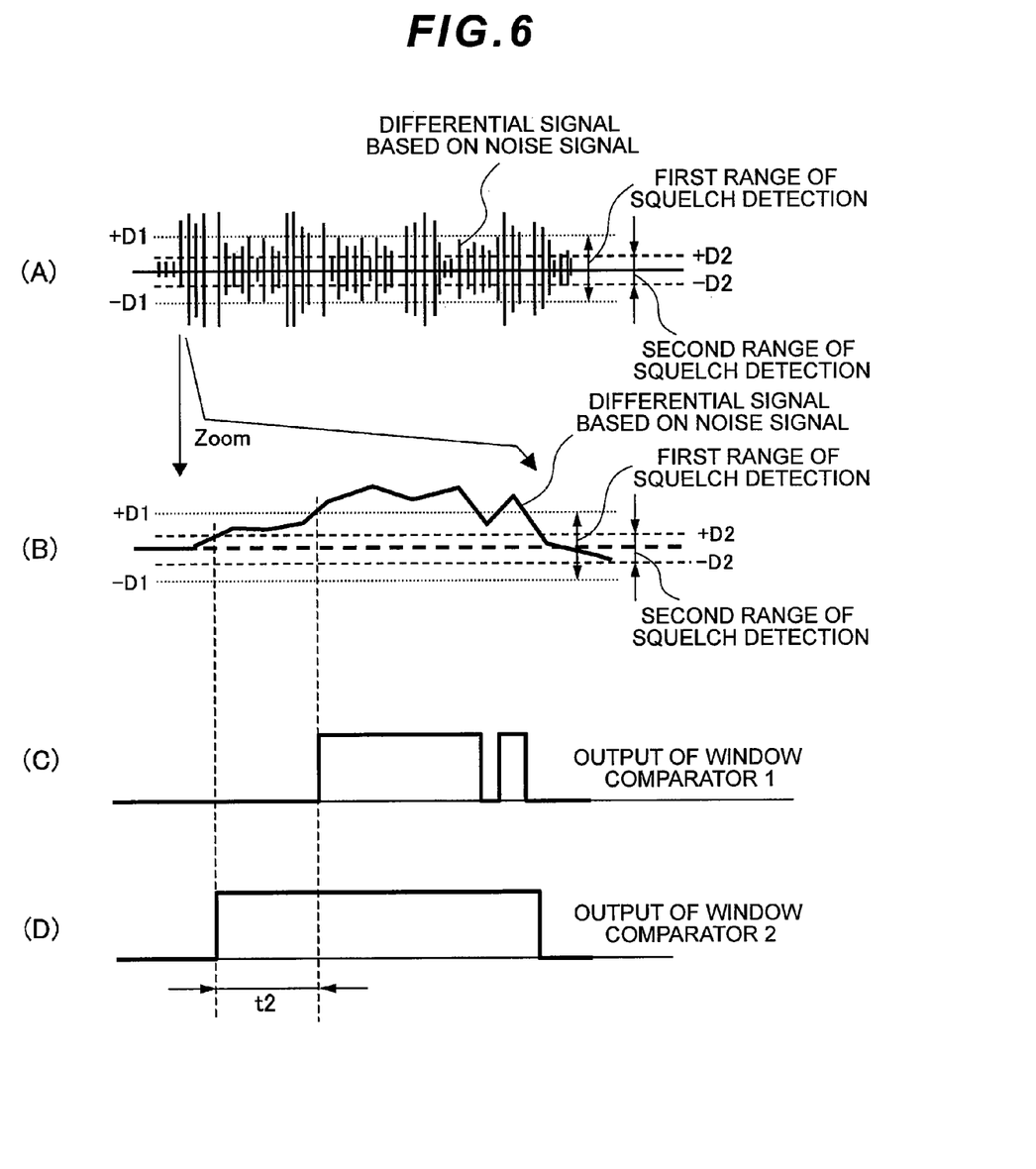
FIG. 6 is a waveform diagram showing the waveform of the differential signal and the first and second window comparator signal in a case where the receiving apparatus of FIG. 4 receives noise.

Meanwhile, if noise is input into the first and second input terminals 2A, 2B of the receiving apparatus 30, the differential signal output from the squelch detection difference amplifier 10 will be of a random waveform as shown in FIG. 6A. In the foregoing case, as shown in FIG. 6B, the rise of the noise will be gradual in comparison to the rise of the burst portions in the OOB signal, and the time difference t2 between the rise timing of the second window comparator signal and the rise timing of the first window comparator signal will increase by just that much.

In this embodiment, the edge timing comparison threshold is set to a value that is slightly greater than the time difference t1 between the rise timing of the first window comparator signal when a normal OOB signal is input and the rise timing of the second window comparator signal output from the second window comparator 11B.

Thus, with the receiving apparatus 30 according to this embodiment, if an OOB signal is input, since the signal level of the comparison determination signal output from the edge timing comparison determination circuit 33 will be of a high level, an OOB detection signal is sent from the OOB detection circuit 34 to the Serial ATA interface control unit 5. Meanwhile, if noise is input, since the signal level of the comparison determination signal output from the edge timing comparison determination circuit 33 will be of a low level, an OOB detection signal will not be sent from the OOB detection circuit 34 to the Serial ATA interface control unit 5. Thus, even if noise is input, the Serial ATA interface control unit 5 will not malfunction.

According to the receiving apparatus 30 of this embodiment, whether the input signal is noise or an OOB signal is determined based on the time difference between the rising edge of the first window comparator signal output from the first window comparator 11A and the rising edge of the second window comparator signal output from the second window comparator 11B. Thus, it is possible to prevent the false detection of noise as an OOB signal with high accuracy and realize a highly reliable receiving apparatus.

(3) Other Embodiments

Although the foregoing first and second embodiments explained a case of applying the present invention to a receiving apparatus for detecting an OOB signal, the present invention is not limited thereto, and can be broadly applied to various types of information detecting apparatuses for detecting transmission information from a transmission signal in which a burst period of transmitting a burst signal and a space period as a no-signal period are repeated in a pattern according to the subject matter of the transmission information.

Moreover, although the foregoing first and second embodiments explained a case of configuring the first comparison circuit for detecting whether the absolute value of the signal level of the transmission signal is not less than the first threshold and the second comparison circuit for detecting whether the absolute value of the signal level of the transmission signal is not less than the second threshold that is different from the first threshold from the first and second window comparators 11A, 11B, respectively, the present invention is not limited thereto, and various other configurations may be broadly applied as the foregoing first and second comparison circuits.

Further, although the foregoing first embodiment explained a case of configuring the determination for determining whether the level displacement of the transmission signal is based on noise or the reception of an OOB signal based on the output of the first and second window comparators 11A, 11B from the first and second waveform shaping circuits 12A, 12B, the first and second OOB detection circuits 13A, 13B, and the AND gate circuit 14, and although the second embodiment explained a case of configuring the foregoing determination unit from the waveform shaping circuit 32, the edge timing comparison determination circuit 33, and the OOB detection circuit 34, and present invention is not limited thereto, and various other configurations may be broadly applied as the configuration of the foregoing determination unit.

In addition to a receiving apparatus for detecting an OOB signal, the present invention can also be broadly applied to various types of information detecting apparatuses for detecting transmission information from a transmission signal in which a burst period of transmitting a burst signal and a space period as a no-signal period are repeated in a pattern according to the subject matter of the transmission information.

What is claimed is:

1. An information detecting apparatus for detecting transmission information from a transmission signal in which a burst period of transmitting a burst signal and a space period as a no-signal period are repeated in a pattern according to the subject matter of the transmission information, comprising:
    a first comparison circuit for detecting whether the absolute value of a signal amplitude level of the transmission signal is not less than a first threshold;
    a second comparison circuit for detecting whether the absolute value of a signal amplitude level of the transmission signal is not less than a second threshold that is different from the first threshold; and
    a determination unit for determining whether the amplitude level displacement of the transmission signal is based on noise or the reception of the transmission information based on the detection results of the first and second comparison circuits.

2. The information detecting apparatus according to claim 1,
    wherein the determination unit includes:
    a first information detection unit for detecting the transmission information from the transmission signal based on the detection result of the first comparison circuit;
    a second information detection unit for detecting the transmission information from the transmission signal based on the detection result of the second comparison circuit; and
    a detected information output unit for outputting the transmission information when the first and second information detection unit detect the same the transmission information based on the detection results of the first and second information detection circuits.

3. The information detecting apparatus according to claim 2,
    wherein the determination unit includes:
    a third information detection unit for detecting the transmission information from the transmission signal based on the detection result of the first comparison circuit; and
    a timing determination unit for determining, based on a time difference between the rise timing of the transmission signal detected by the first comparison circuit and the rise timing of the transmission signal detected by the second comparison circuit, whether the time difference is within a predetermined third threshold, and
    wherein the third information detection unit detects the transmission information from the transmission signal based on the detection result of the first comparison circuit, and outputs the transmission information when the timing determination unit determines that the time difference is within the third threshold.

4. An information detecting method for detecting transmission information from a transmission signal in which a burst period of transmitting a burst signal and a space period as a no-signal period are repeated in a pattern according to the subject matter of the transmission information, comprising:
    a first step of detecting whether the absolute value of a signal amplitude level of the transmission signal is not less than a first threshold, and detecting whether the absolute value of a signal amplitude level of the transmission signal is not less than a second threshold that is different from the first threshold; and
    a second step of determining whether the amplitude level displacement of the transmission signal is based on noise or the reception of the transmission information based on the detection results.

* * * * *